May 24, 1932.  J. L. DRAKE  1,860,085
PROCESS AND APPARATUS FOR PRODUCING SHEET GLASS
Original Filed Nov. 30, 1926
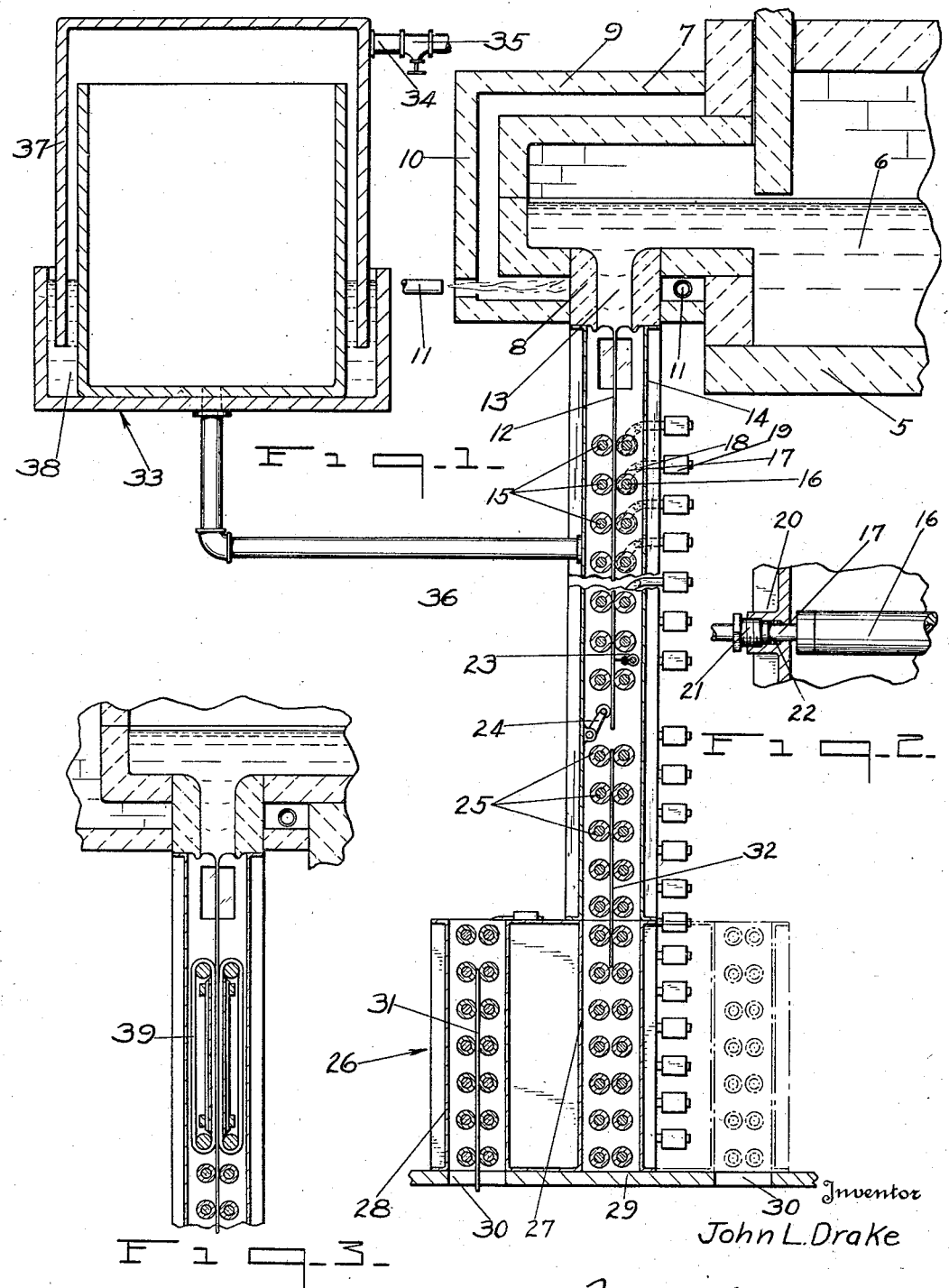
Inventor
John L. Drake
By Frank Fraser
Attorney Patented May 24, 1932

1,860,085

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Substitute for application Serial No. 151,672, filed November 30, 1926. This application filed November 10, 1930. Serial No. 494,675.

The present invention relates to sheet glass apparatus.

An important object of the invention is to provide, in sheet glass apparatus, means for forming a sheet under pressure.

A further object of this invention is to provide an apparatus of this nature wherein a sheet is continuously and positively drawn downwardly from a source of molten glass.

Another object of the invention is to provide an apparatus for producing sheet glass wherein a sheet of glass may be continuously drawn from a source of molten glass, the source being supported on an air cushion.

Another object of the invention is to provide sheet glass forming apparatus wherein a sheet is drawn downwardly from a source of molten glass which is constantly urged in a direction opposite to the draw of the sheet.

A still further object of the invention is to produce sheet glass by drawing a sheet from a mass of molten glass while maintaining an air pressure in surrounding relation to the sheet during its formative period.

Another object of the invention is to provide an apparatus of this nature wherein a sheet of glass is drawn downwardly from a molten mass, the sheet being formed in a compartment having an air pressure therein, said sheet being cut transversely of its length and removed from said compartment in a manner that the pressure therein will not be disturbed.

Other objects and advantages of the invention will become more apparent during the course of the following description.

In the drawings wherein like numerals are employed to designate like parts throughout the same, Fig. 1 is a vertical longitudinal section through a sheet glass forming apparatus constructed in accordance with the present invention, Fig. 2 is an enlarged sectional detail of a portion of the machine, and Fig. 3 is a fragmentary vertical longitudinal section through a slightly modified form of construction.

In the drawings, the numeral 5 designates a tank furnace containing a mass of molten glass 6. The numeral 7 designates a boot or draw receptacle which is continuously supplied with molten glass from the furnace 5. The bottom of the receptacle 7 is provided with a transverse slot having depending therefrom lips or slabs 8. Arranged around the receptacle 7 is a spaced wall 9 forming a compartment 10 which may be heated to properly control the temperature of the glass in said receptacle. Heating means 11 may be associated with the compartment 10.

A sheet 12 is adapted to be continuously drawn downwardly from the source 13 disposed between the spaced lips or downwardly extending projections 8. Arranged around the sheet is a housing 14 forming a closed compartment, the upper end of the housing being associated with the lips 8 in a manner that an air-tight joint is had.

Arranged within the housing 14 is a plurality of preferably stationary rotatable rolls 15, and cooperating with the stationary rolls 15 are preferably adjustable rotatable rolls 16. Each of the rolls 16 may be carried by suitable brackets 17 pivoted as at 18. Weights 19 may be associated with the ends of the arms 17 in a manner that the rolls will be normally urged toward the stationary rolls 15.

In Fig. 2 is shown a fragmentary detail of the method of mounting the rolls within the housing. As is shown, a suitable flange 20 may be carried by the housing walls 14. The roll 16 is carried by the shaft 17 extending outwardly through the flange 20 and journaled in a suitable bushing 21. A packing material 22 may be interposed between the end of the bushing 21 and the wall of the housing 14 so that an air-tight bearing will be formed for the shaft.

At least some of the rolls 15 and rolls 16 are positively driven and are adapted to constantly draw the sheet 12 from its source 13. The rolls are preferably formed from such material as asbestos or a form of non-corrosive metal so that the surfaces of the sheet will not be injured during the drawing operation. It will be seen that any thickness of sheet can be produced as the rolls 16 are movable about their pivots 18, the weights being sufficiently heavy to cause the rolls to remain in contact with the sheet being produced, but not sufficiently heavy to cause an injurious pressure upon the sheet.

Arranged at the bottom of the housing 14 is a transfer mechanism. The sheet, in its downward movement, is cut transversely of its line of draw by a cutting mechanism illustrated diagrammatically and designated by the numeral 23. A suitable guide roll 24 may be provided within the housing and adapted to contact with the sheet as illustrated in Fig. 1. It will be seen that a group of rolls, numbered 25, is arranged at the bottom of the housing 14. These rolls are driven relatively faster than the upper rolls 15 and 16 so that as the sheet passes therebetween they will be carried away relatively faster, making the gap between the cut sheet and its succeeding sheet comparatively great. The sheet is preferably transferred by the mechanism designated in its entirety by the numeral 26, so that the interior of the housing surrounding the sheet will not be affected. As is shown, the transfer mechanism 26 comprises two compartments 27 and 28 respectively. The compartments 27 and 28 are movable as a unit, being formed by a suitable framework movable upon a base 29. Formed in the base 29 are openings 30, being of the same size as the interior of the compartments 27 and 28. As is shown in full lines, the compartment 28 is in alignment with one of the openings 30, and the sheet 31 is being fed downwardly. The compartment 27 is receiving the sheet 32, and when the sheet 31 has passed completely out of the compartment 28, the sheet 32 will have passed completely into the compartment 27. The transfer mechanism is then shifted to a position illustrated in dotted lines so that the compartment 27 will register with the other openings 30, and as the sheet 32 is passing from the compartment 27, another sheet will be passing into the compartment 28.

In accordance with the present invention a pressure is set up and maintained within the housing 14, and to accomplish this a suitable pressure supply reservoir 33 may be supplied. The pressure supply reservoir has connection by means of the pipe 34 and valve 35 to a suitable pressure means. To permit a constant pressure within the compartment formed by the housing 14, a conduit 36 connects reservoir 33 and housing 14. The bell 37 floats in a sealing means 38. The pressure means used is preferably air which may be heated or not as desired.

By the pressure means illustrated, or its equivalent, a pressure is created within the compartment surrounding the sheet 12, the pressure being such that the head pressure of the source of molten glass 13 will be preferably counteracted so that the sheet 12 can be positively drawn from its source instead of flowed therefrom. By positively drawing the sheet downwardly in this manner, a more uniform thickness and flatness of sheet can be had, as the pressure will offer the necessary resistance required. As the pressure is constant, there will be no tendency toward thick and thin spots in the sheet. By means of the transfer mechanism set forth, the finished sheets of glass can be handled without interruption to the pressure within the compartment.

In Fig. 3, endless conveyors 39 are used instead of the rolls 15 and 16.

The pressure in the housing is such that the sheet source will be urged in a direction opposite to the direction of draw of the sheet. In other words, the pressure will overcome gravity, and thus prevent a flowing of the glass, but on the other hand will make it necessary to positively draw the sheet. This feature is entirely different than the principle upon which the prior art structures are based. Heretofore, machines have been designed to permit a downward flow of glass, but due to differences in viscosity of the glass, flowing of glass downwardly is not satisfactory.

The glass sheet is also preferably annealed in the compartment before it enters into the transfer mechanism. As the compartment formed by the housing 14 is vertical, the hottest air will be at the top and will naturally become progressively cooler as the bottom of said compartment is approached. This condition makes said compartment an ideal annealing chamber. Supplementary heating or cooling means can be employed to control the temperature around the sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a source of molten glass, means for drawing a sheet downwardly therefrom, and a gaseous fluid for exerting a pressure against said source, in a direction opposite to the movement of the sheet of glass, said pressure being sufficient to support the sheet source.

2. In sheet glass apparatus, a receptacle containing a source of molten glass, means for drawing a sheet downwardly therefrom, and means for supporting said source on a cushion of gaseous fluid.

3. In sheet glass apparatus, a receptacle containing a source of molten glass, means for drawing a sheet downwardly therefrom, a housing arranged around the sheet, and means for creating a pressure within said housing, said pressure being sufficient to support the sheet source.

4. In sheet glass apparatus, a receptacle containing a source of molten glass, means for continuously and positively drawing a sheet downwardly therefrom, means for forming a closed compartment around said source and sheet, and means for automatically maintaining a uniform predetermined gaseous fluid pressure within and throughout said compartment.

5. In sheet glass apparatus, a receptacle containing a source of molten glass, means for continuously and positively drawing a sheet downwardly therefrom, means for forming a closed compartment around said source and sheet, and means for automatically maintaining a predetermined gaseous fluid pressure within said compartment, the gaseous fluid pressure being such as to support the sheet source.

6. In sheet glass apparatus, a receptacle containing a source of molten glass, means for drawing a sheet downwardly therefrom, means for forming a closed compartment around said source and sheet, means for creating a gaseous fluid pressure within said compartment great enough to support said sheet source, and means for removing the sheet from said compartment without disturbing the gaseous fluid pressure therein.

7. In sheet glass apparatus, a receptacle containing a source of molten glass, means for drawing a sheet downwardly therefrom, means for forming a closed compartment around said source and sheet, means for creating a gaseous fluid pressure within said compartment great enough to support said sheet source, means for removing the sheet from said compartment without disturbing the gaseous fluid pressure therein, and means for cutting the sheet transversely of its length.

8. The process of producing sheet glass, consisting in supporting a source of molten glass on a gaseous fluid cushion, and then drawing a sheet therefrom.

9. The process of producing sheet glass, consisting in supporting a mass of molten glass on a gaseous fluid cushion, and then drawing a sheet downwardly therefrom.

Signed at Toledo, in the county of Lucas and State of Ohio, this 7th day of November, 1930.

JOHN L. DRAKE.